(12) United States Patent
Kato (10) Patent No.: US 11,953,087 B1
(45) Date of Patent: Apr. 9, 2024

(54) SHIFT LEVER DEVICE FOR ELECTRIC VEHICLE

(71) Applicant: MANNOH INDUSTRIAL CO., LTD, Anjo (JP)

(72) Inventor: Saburo Kato, Anjo (JP)

(73) Assignee: Mannoh Industrial Co., Ltd., Anjo (JP)

( * ) Notice: Subject to any disclaimer, the term of this patent is extended or adjusted under 35 U.S.C. 154(b) by 0 days.

(21) Appl. No.: 18/190,189

(22) Filed: Mar. 27, 2023

(30) Foreign Application Priority Data

Jan. 25, 2023 (JP) ................................. 2023-009151

(51) Int. Cl.
*F16H 59/10* (2006.01)
*F16H 61/02* (2006.01)
*F16H 61/24* (2006.01)

(52) U.S. Cl.
CPC ....... *F16H 59/105* (2013.01); *F16H 61/0204* (2013.01); *F16H 2061/247* (2013.01)

(58) Field of Classification Search
CPC ............... F16H 59/105; F16H 61/0204; F16H 2061/247
USPC ....................................................... 74/473.3
See application file for complete search history.

(56) References Cited

U.S. PATENT DOCUMENTS

2010/0083784 A1* 4/2010 Bortolon ............. F16H 59/0204
74/473.21

FOREIGN PATENT DOCUMENTS

| DE | 10003796 A1 * | 8/2001 | ........... F16H 59/105 |
| JP | 6115699 B2 | 4/2017 | |

* cited by examiner

*Primary Examiner* — T. Scott Fix
(74) *Attorney, Agent, or Firm* — BURR PATENT LAW, PLLC (57) ABSTRACT

A shift lever device for an electric vehicle that provides the feeling of operating an MT shift lever. The device includes a retainer with a spherical bearing, a lever body that can swing in a shift direction and a select direction about a ball held in the spherical bearing, and a position sensor unit placed at a lower portion of the retainer. The position sensor unit includes a slider that can slide in a case in the select direction, a magnet that can slide on the slider in the shift direction, a sensor board placed on a bottom of the case and configured to detect a position of the magnet, and a detent plate with an MT shift pattern on a top surface of the case. The magnet is engaged with a lower end of the lever body that penetrates the detent plate and extends into the case.

3 Claims, 13 Drawing Sheets

Fig. 1

PRIOR ART

SHIFT LEVER DEVICE FOR ELECTRIC VEHICLE

FIELD OF THE INVENTION

The present invention relates to a shift lever device for an electric vehicle.

BACKGROUND OF THE INVENTION

In an electric vehicle powered by an electric motor also incorporates a shift lever device to switch between drive (D), reverse (R), parking (P), neutral (N), and other positions. One example is described in Japanese Patent No. 6115699 in which a shift pattern similar to an AT shift lever for an engine-powered vehicle is disclosed.

In addition, since an electric vehicle does not need to switch a transmission (gearbox) like conventional engine-powered vehicles, but only needs to electrically control the electric motor, the form of a conventional device is disused in favor of a form of a rotary electric switch or the like.

In Europe and the United States, as well as Japan, where motor sports are popular, motor sports enthusiasts have a strong nostalgia for a shift lever device that has a shift pattern similar to that of a manual transmission (MT) for an engine-powered vehicle, and they tend to seek the feeling of operating the MT shift lever when driving electric vehicles. However, no such shift lever device for electric vehicles is known.

CITATION LIST

Patent Document
Patent document 1: Japanese Patent No. 6115699

SUMMARY OF THE INVENTION

An object of the present invention is to solve the above-mentioned conventional problem and to provide a shift lever device for an electric vehicle that can provide the feeling of operating an MT shift lever.

A shift lever device for an electric vehicle according to the present invention developed to solve the above problem includes: a retainer in which a spherical bearing is disposed; a lever body that is able to swing in a shift direction and a select direction about a ball shaft held in the spherical bearing; and a position sensor unit that is placed at a lower portion of the retainer. The position sensor unit includes a slider that is able to slide in a case in the select direction, a magnet that is able to slide on the slider in the shift direction, a sensor board that is placed on a bottom surface of the case and configured to detect a position of the magnet, and a detent plate with an MT shift pattern placed on an upper surface of the case, and the magnet is engaged with a lower end of the lever body that penetrates the detent plate and extends into the case.

The sensor board preferably includes a sensor IC that is configured to detect the magnet at the lower end of the lever body and placed on the sensor board.

The lever body preferably includes a shift bellcrank that is configured to swing in a shift plane when a shifting operation is given to the lever body, and a shift detent pin that is provided on a tip end of the shift bellcrank is preferably made to come into contact with a shift detent ridge fixed to the retainer to hold a position in the shift direction.

In addition, the lever body preferably includes a select bellcrank that is configured to swing in a select plane when a selecting operation is given to the lever body, and a select detent pin that is provided on a tip end of the select bellcrank is preferably made to come into contact with a select detent ridge fixed to the retainer to hold a position in the select direction.

With the shift lever device for an electric vehicle according to the present invention, when the lever body is operated while being guided by the detent plate with the MT shift pattern, the sensor board of the position sensor unit detects an operating position, and the electric motor as the drive source can be controlled depending on the output of the sensor board. Thus, an electric vehicle can be driven with the feeling of operating an MT shift lever. In addition, by making the structure capable of holding the position in the shift direction and the select direction, it is possible to provide a feeling even closer to the operation of an MT shift lever for an engine-powered vehicle.

DETAILED DESCRIPTION OF THE INVENTION

Prior to describing an embodiment, a conventional MT shift lever device for an engine-powered vehicle is briefly described with reference to FIG. 1.

Figure 1:
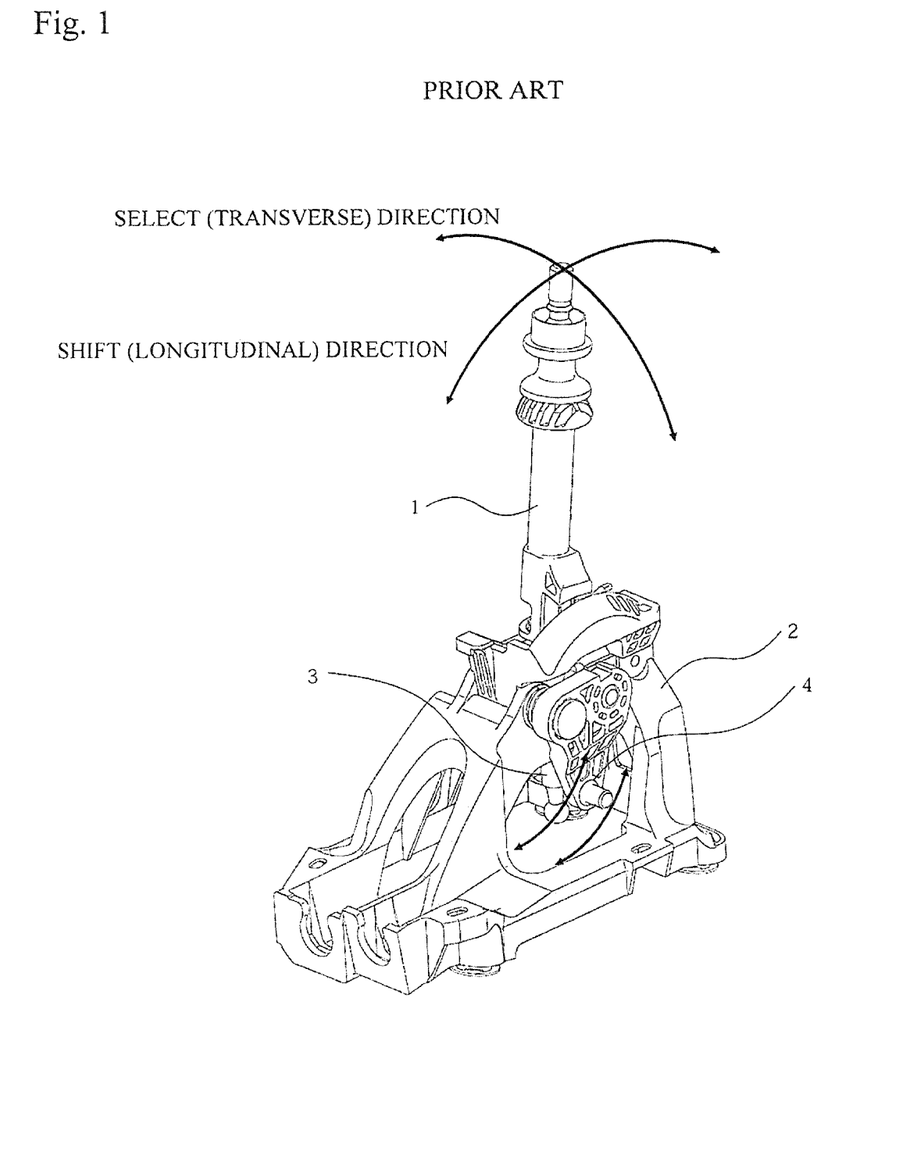
FIG. 1 is a perspective view illustrating a conventional MT shift lever device for an engine-powered vehicle.

As illustrated in FIG. 1, a lever body 1 that can swing in a shift direction (vehicle longitudinal direction) and a select direction (vehicle transverse direction) is held in a retainer 2. In the retainer 2, a shift arm 3 and a select arm 4 are provided, and one end of a shift cable and one end of a select cable, which are not illustrated, are attached to a tip end of the shift arm 3 and a tip end of the select arm 4, respectively. The other ends of these shift control cables are connected to a transmission, which is not illustrated. When the lever body 1 is operated in the shift direction or the select direction, the shift arm 3 and the select arm 4 are moved in the vehicle longitudinal direction, and the operation of the lever body 1 is transmitted to the transmission through the shift control cables.

Figure 2:
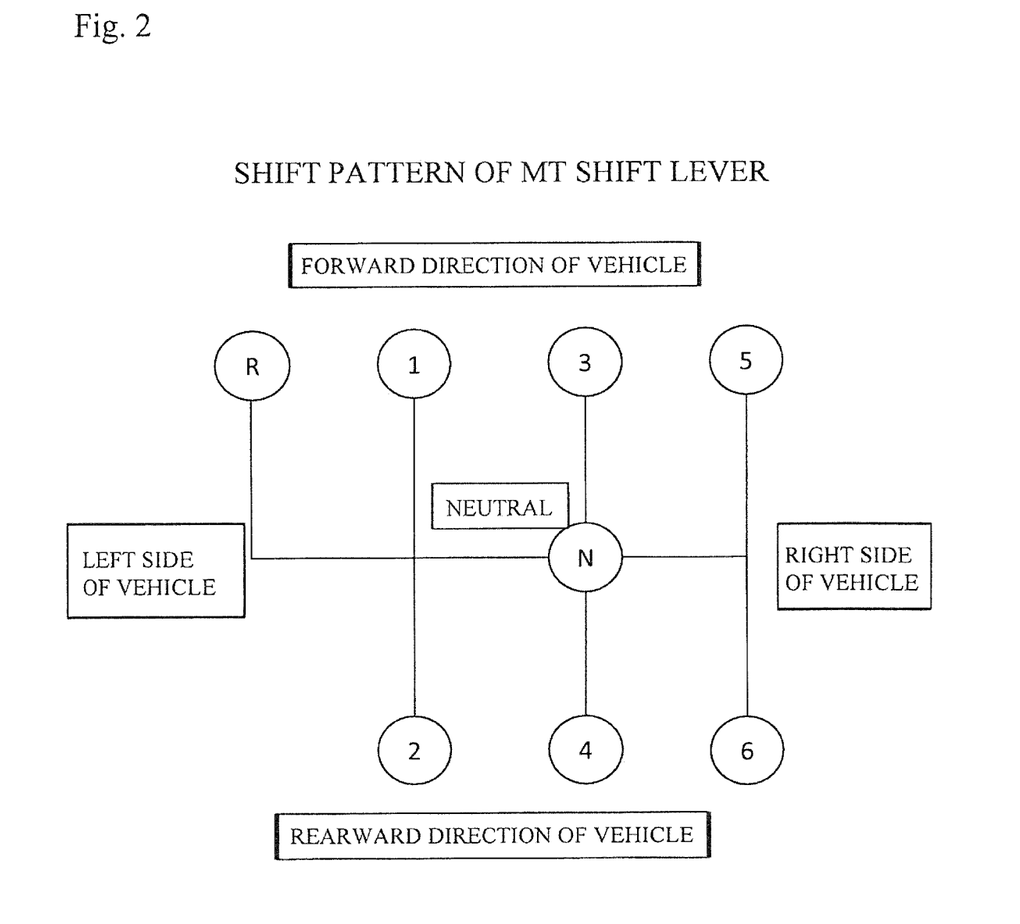
FIG. 2 is a shift pattern diagram of an MT shift lever.

FIG. 2 is a diagram illustrating an example of a shift pattern of an MT shift lever. The N position is in the center, the R, 1st, 3rd, and 5th positions are located on the side in the forward direction of the vehicle, and the 2nd, 4th, and 6th positions are located on the side in the rearward direction of the vehicle. The same shift pattern as in FIG. 2 is used in the embodiment of the present invention described later, but it is obvious that the shift pattern is not limited to the pattern in FIG. 2.

Figure 3:
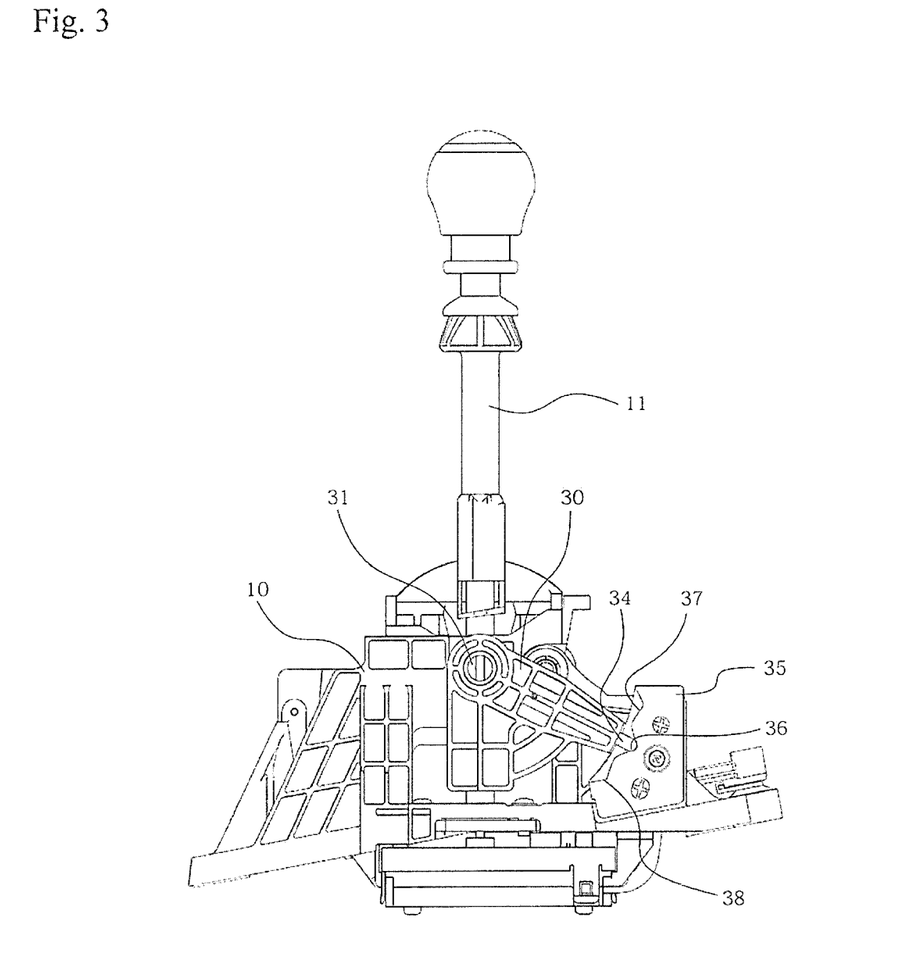
FIG. 3 is a side view illustrating a shift lever device for an electric vehicle of an embodiment.
Figure 4:
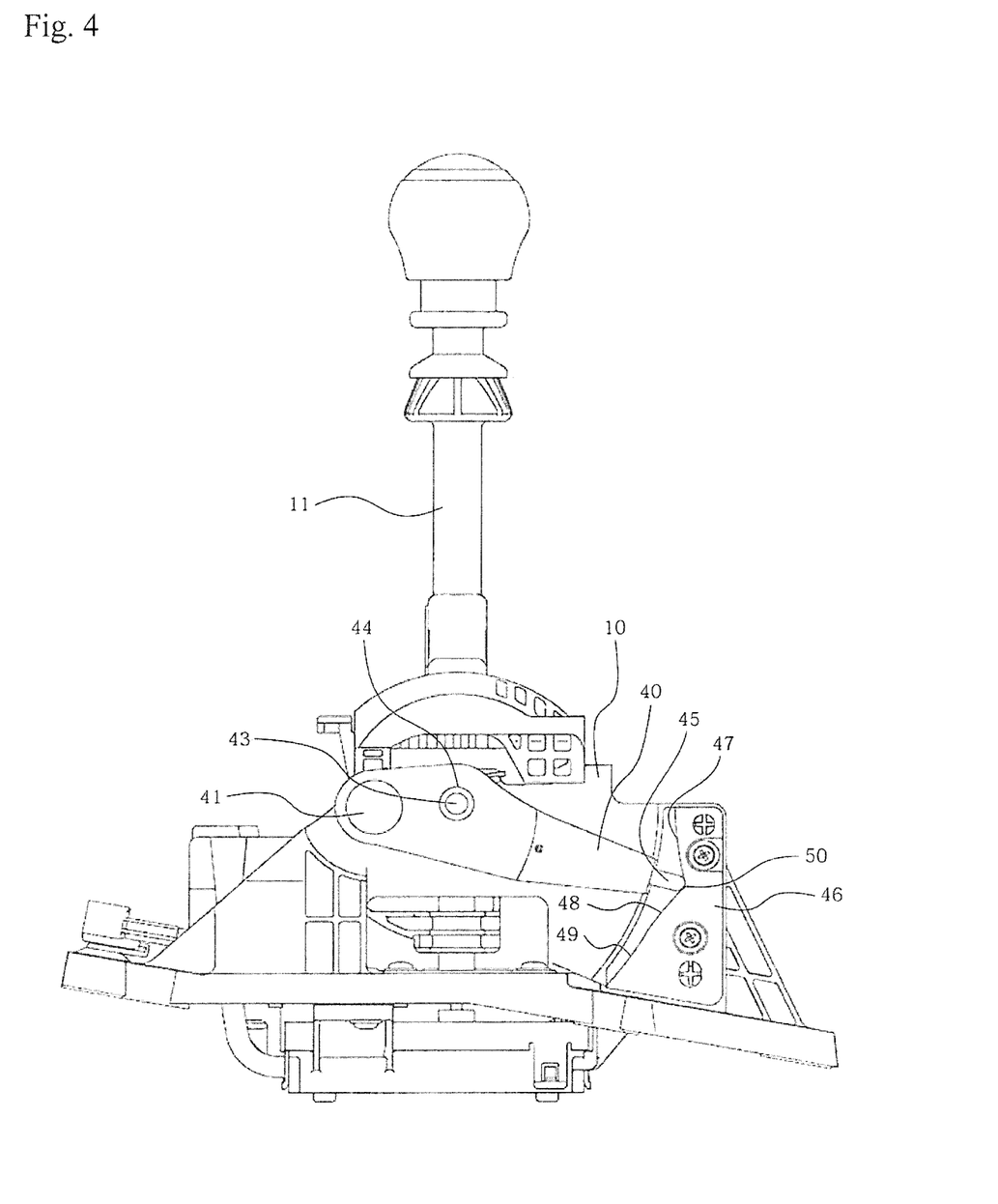
FIG. 4 is a side view illustrating an internal structure of the shift lever device for an electric vehicle of the embodiment.
Figure 5:
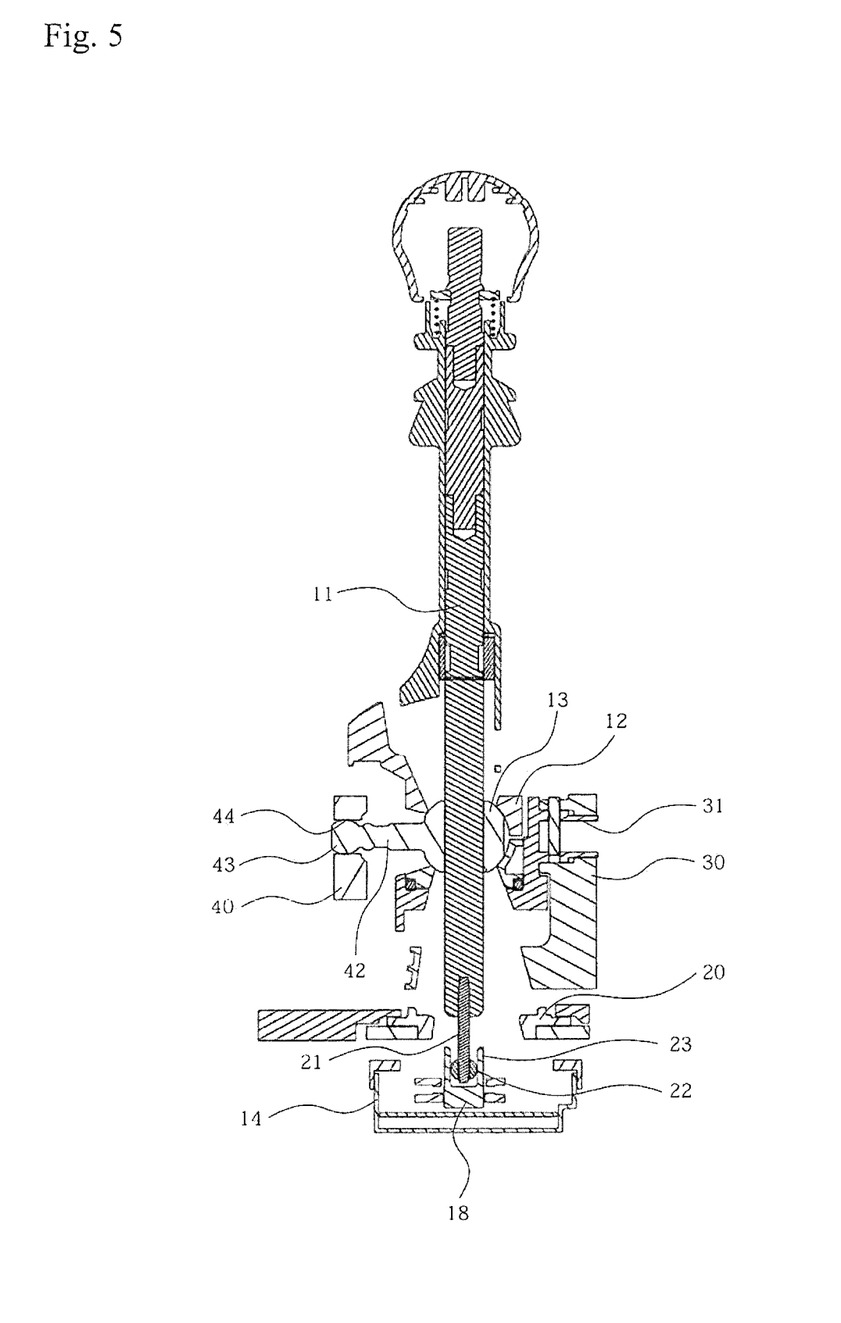
FIG. 5 is a sectional view of the shift lever device for an electric vehicle of the embodiment.

FIG. 3 is a side view illustrating a shift lever device for an electric vehicle of the embodiment, FIG. 4 is a side view illustrating the internal structure of the shift lever device, and FIG. 5 is a sectional view of the shift lever device. In these diagrams, reference sign 10 denotes a retainer that is hollow, and reference sign 11 is a lever body. As illustrated in FIG. 5, a spherical bearing 12 is provided in the retainer 10, and a ball 13, which is held by the spherical bearing 12, is provided at a position slightly below the center of lever body 11. The lever body 11 can swing about the ball 13 in the shift direction and the select direction.

Figure 6:
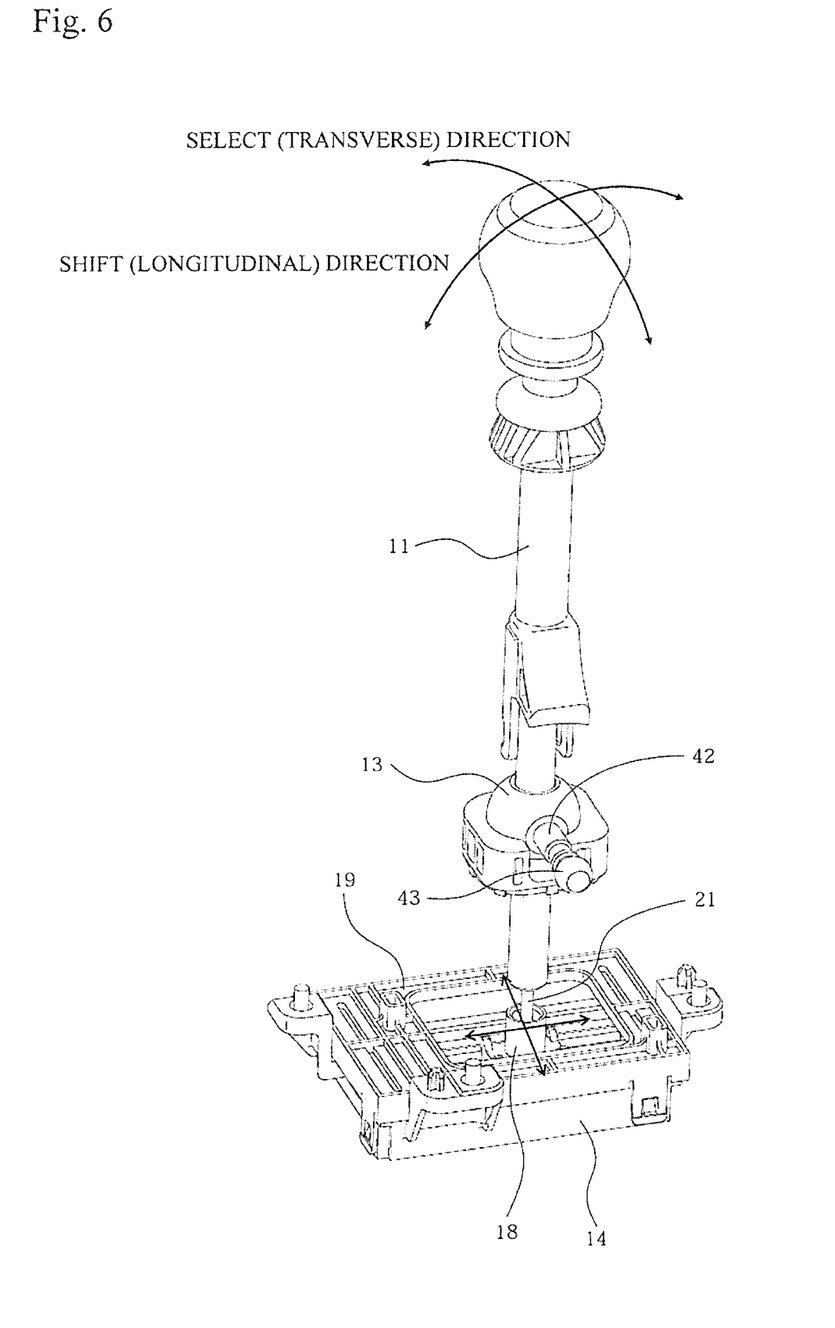
FIG. 6 is a perspective view illustrating relationship between a lever body and a position sensor unit.
Figure 7:
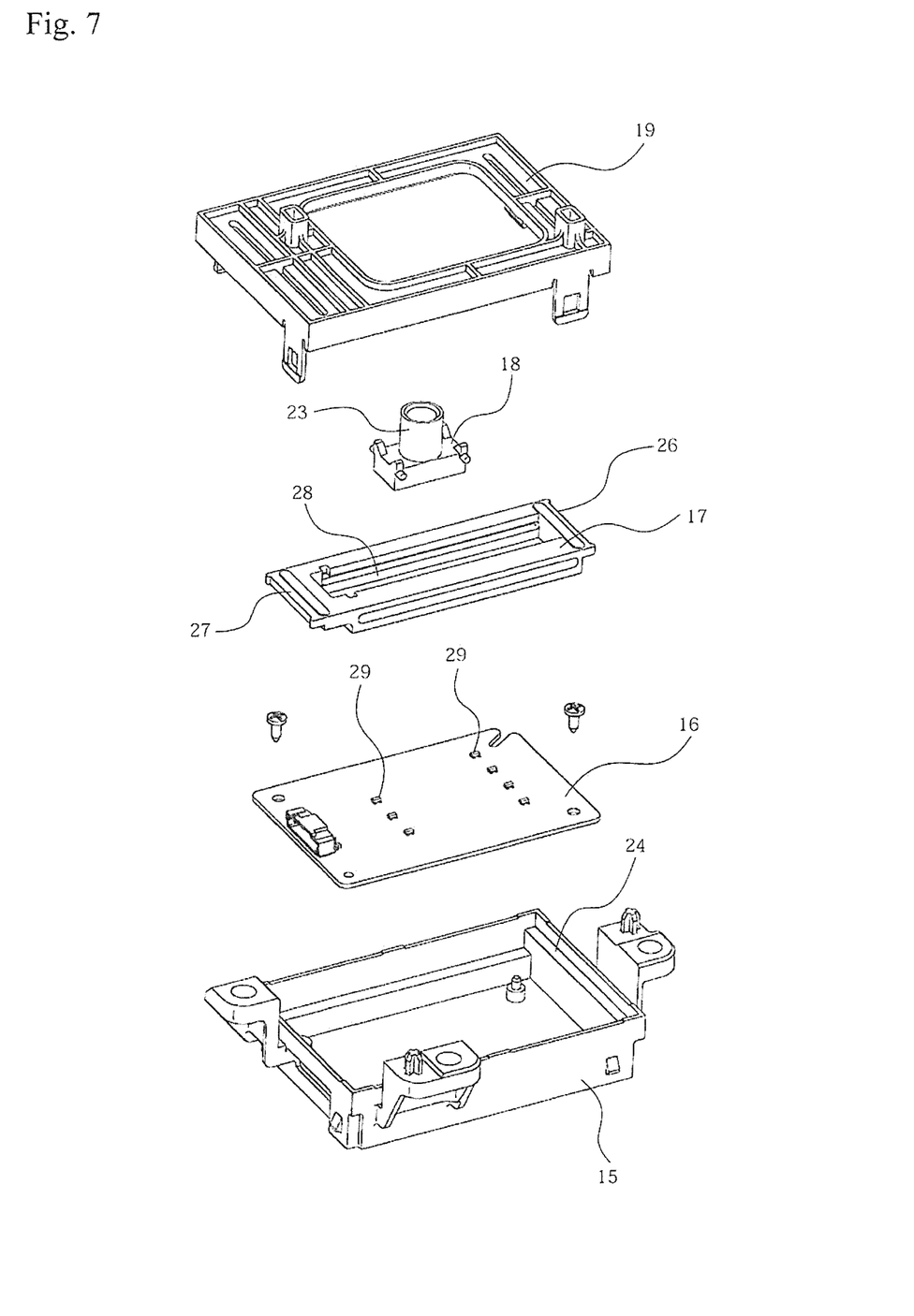
FIG. 7 is an exploded view of the position sensor unit.
Figure 8:
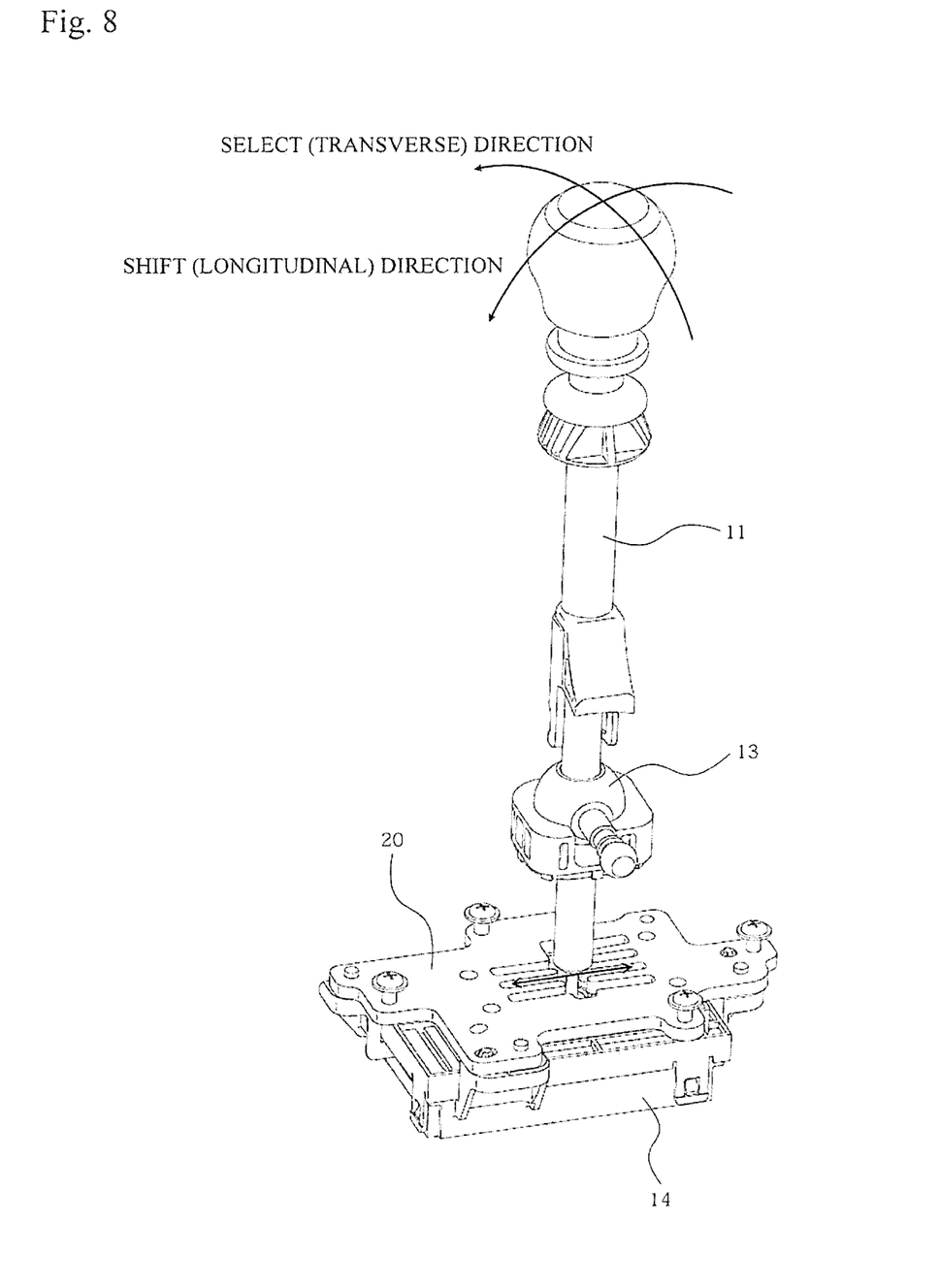
FIG. 8 is a perspective view illustrating a detent plate on an upper surface of the position sensor unit.

A position sensor unit 14 illustrated in FIG. 6 is placed in a lower portion of the retainer 10. FIG. 7 is an exploded view of the position sensor unit 14. As illustrated in FIG. 7, the position sensor unit 14 includes a rectangular case 15 an upper surface of which is opened, a sensor board 16, a slider 17, a magnet 18, and a cover 19. In addition, as illustrated in FIG. 8, a detent plate 20 is placed on the upper surface of the cover 19. The detent plate 20 has a through hole corresponding to the MT shift pattern.

Figure 9:
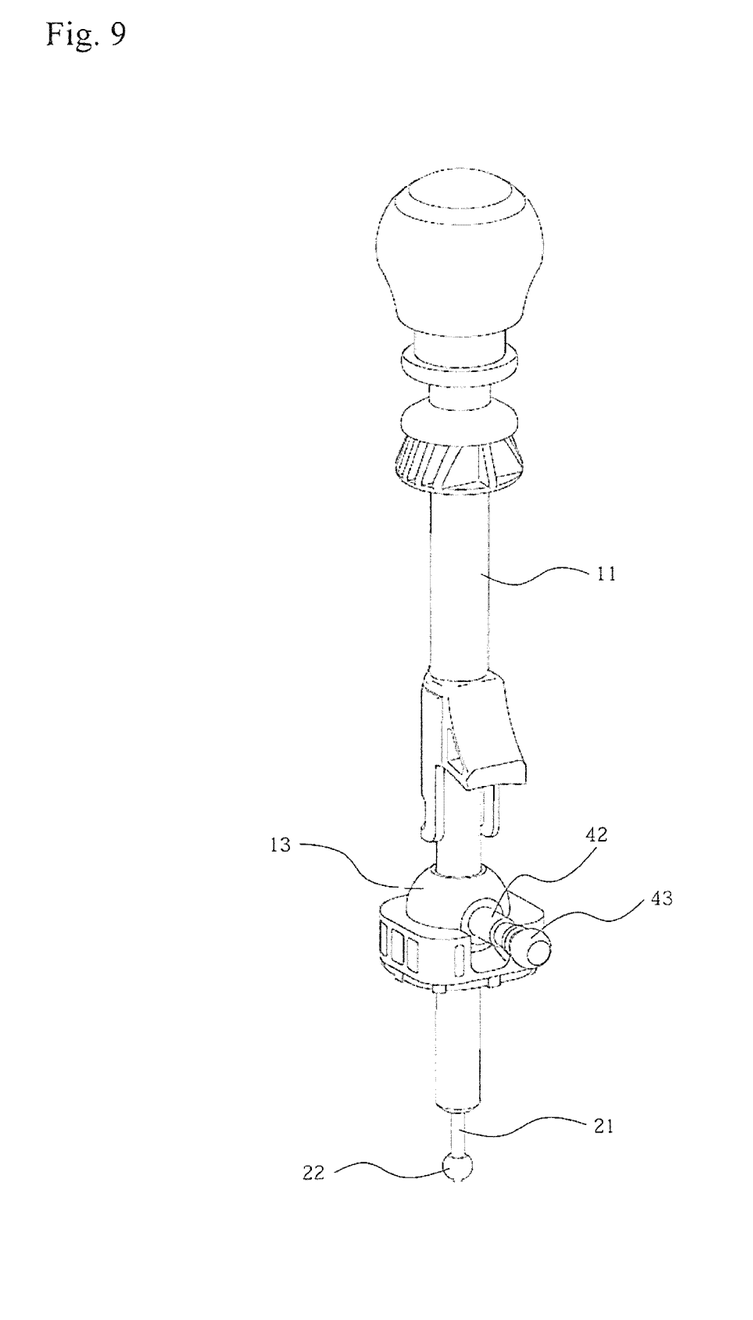
FIG. 9 is a perspective view illustrating the entire lever body.

As illustrated in FIG. 9, the lower end of the lever body 11 is provided with a ball joint 22, a small-diameter rod 21 being interposed therebetween, and a tubular portion 23 formed on the upper surface of the magnet 18 fits into the ball joint 22. The small-diameter rod 21 penetrates the through hole in the detent plate 20 and reaches the interior of the position sensor unit 14. Thus, the motion of the lever body 11 is restricted by the through hole in the detent plate 20, so that only the operation corresponding to the MT shift pattern is allowed.

On both the front and rear sides of the case 15 of the position sensor unit 14 in the shift direction, steps 24 extending in the select direction are formed. The slider 17 has a projecting part 26 put on one of the steps 24 and a projecting part 27 put on the other step 24. This allows slider 17 to slide in the select direction in the case 15. In addition, a long groove 28 that extends in the shift direction is formed in the slider 17, allowing the magnet 18 having a rectangular shape to slide in the long groove 28 in the shift direction. With this structure, the magnet 18 attached to the lower end of the lever body 11 is caused to move in the shift direction and the select direction in the case 15 when the lever body 11 moves while being restricted by the through hole in the detent plate 20.

Figure 10:
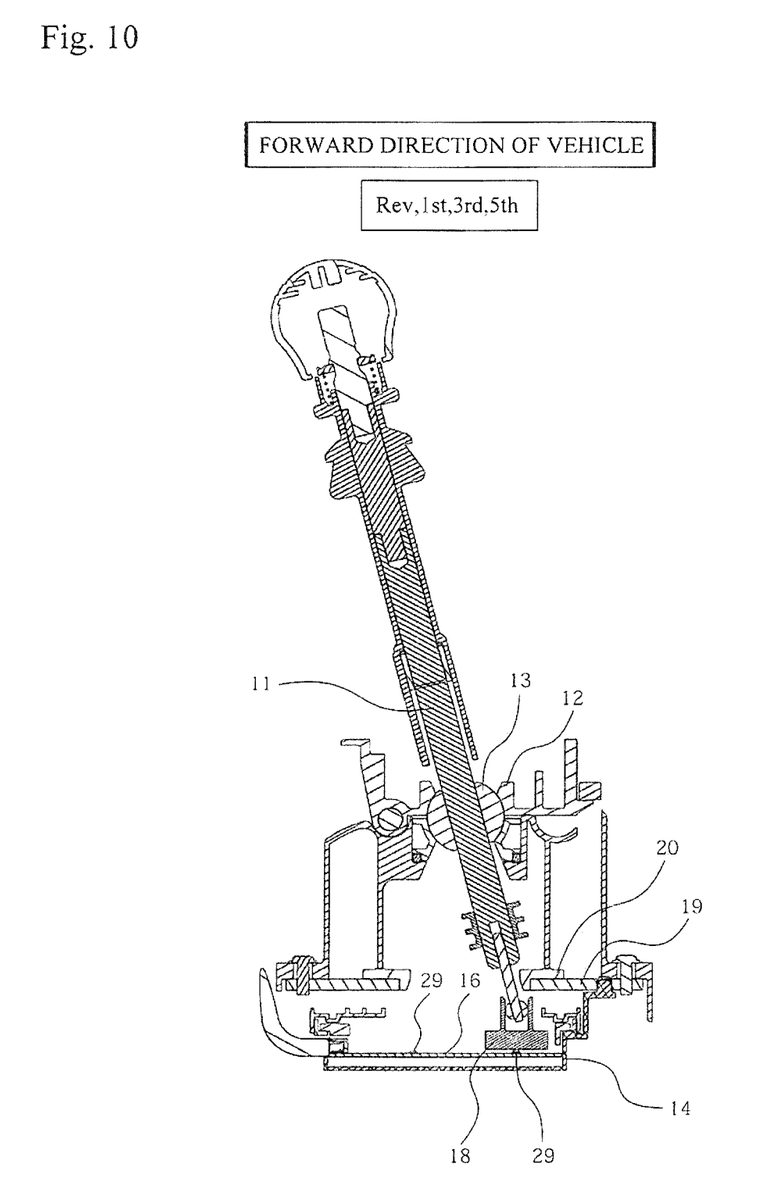
FIG. 10 is a sectional view illustrating a state where the lever body is given a shifting operation and oriented in a forward direction of a vehicle.
Figure 11:
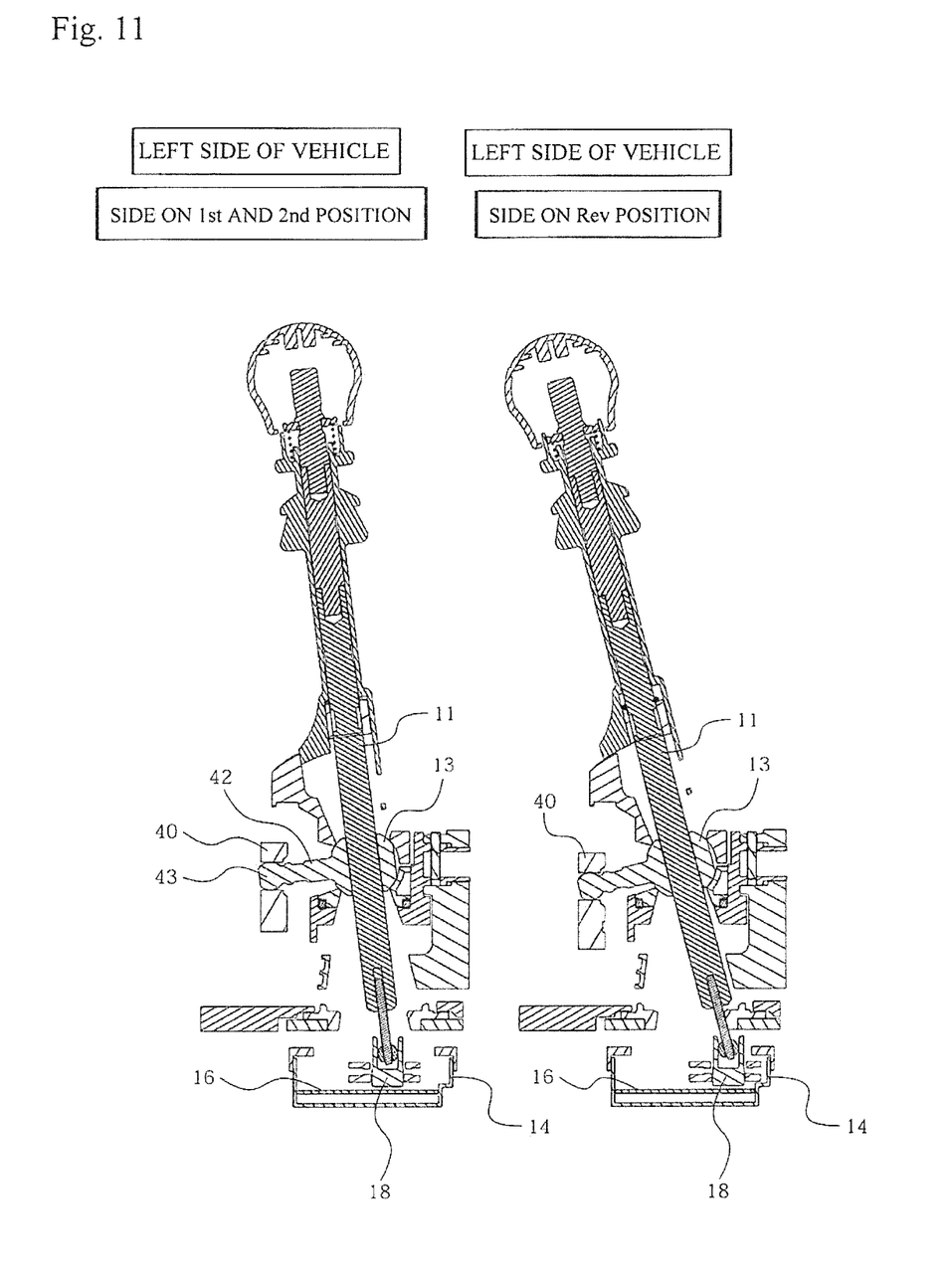
FIG. 11 is a sectional view illustrating a state where a selecting operation to the left side of the vehicle is given to the lever body.

The sensor board 16 is fixed to a bottom surface of the case 15. As illustrated in FIG. 7, on the sensor board 16, sensor ICs 29 are disposed in two rows, or a front row and a rear row, and each sense magnetic force when the magnet 18 comes to the position directly thereabove, and output an electrical signal. For reference, FIG. 10 illustrates a sectional view of the lever body 11 operated in the forward direction of the vehicle, and FIG. 11 illustrates a sectional view of the lever body 11 operated to the reverse position in the left side of the vehicle.

In the conventional MT shift lever device for an engine-powered vehicle illustrated in FIG. 1, a position holding function for the shift lever device was able to be implemented in the transmission because the shift control cables connect between the shift lever device and the transmission. However, in an electric vehicle in which no transmission is present, the shift lever device itself needs a position holding function. The structure for implementing the position holding function is described below.

Figure 12:
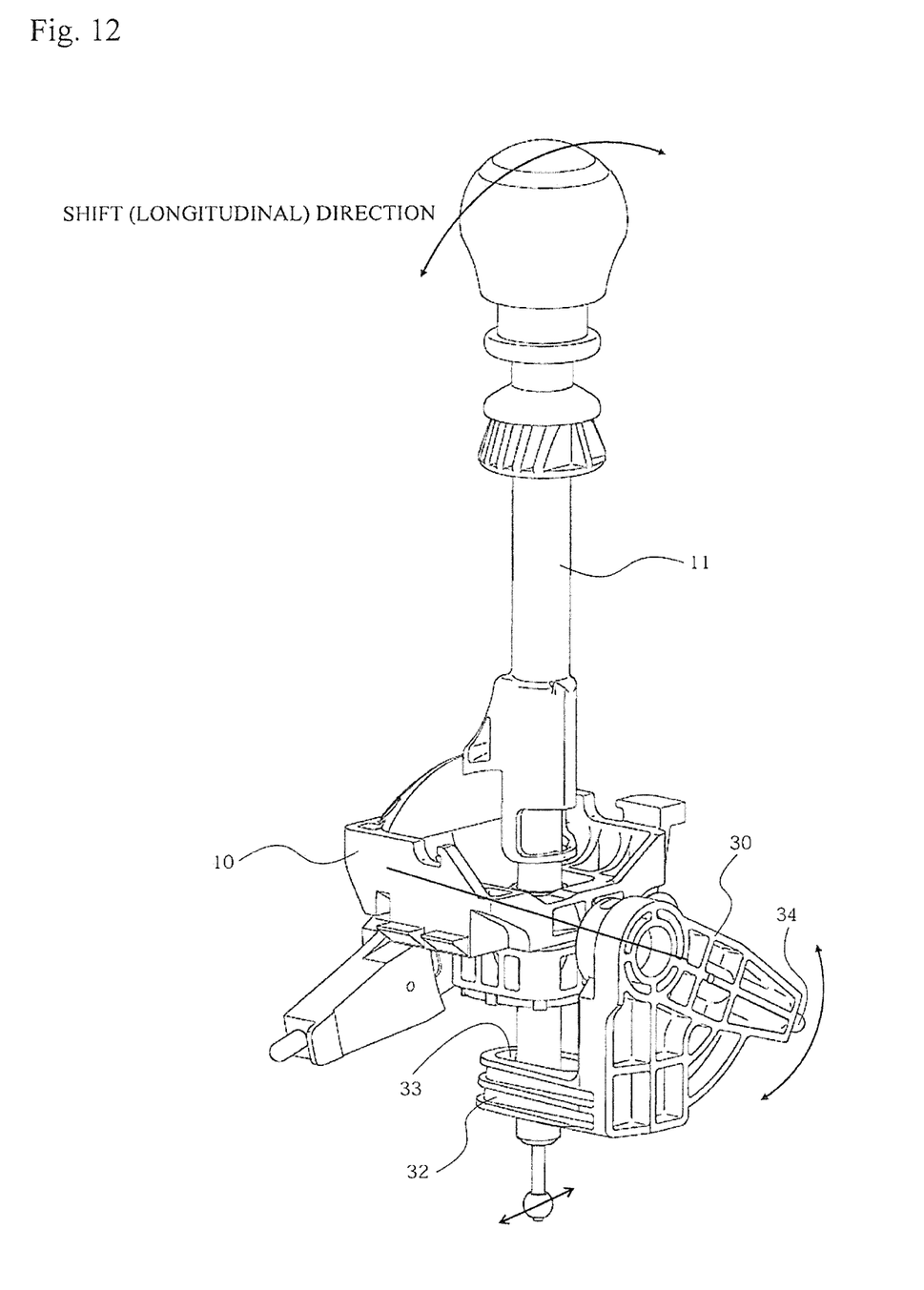
FIG. 12 is a perspective view illustrating a position holding structure for the shifting operation.

As illustrated in FIG. 12, a shift bellcrank 30 is supported on one side of the retainer 10. As illustrated in the sectional view in FIG. 5, a short shaft 31 is provided on a side surface of the retainer 10, and an upper portion of the shift bellcrank 30 is supported on the short shaft 31. The centerline of the short shaft 31 passes through the center of the aforementioned spherical bearing 12 and the ball 13. In addition, a bent piece 32 that is bent inward is provided on a lower portion of the shift bellcrank 30, and the lever body 11 passes through a through hole 33 in the bent piece 32. Thus, when a shifting operation is given to the lever body 11, the shift bellcrank 30 swings in the shift direction about the short shaft 31 following the motion of the lever body 11.

A shift detent pin 34 is provided on a tip end of the shift bellcrank 30. A base part of the shift detent pin 34 is housed in the shift bellcrank 30 and is repulsed in a protruding direction by a spring, which is not illustrated. As illustrated in FIG. 3, a shift detent ridge 35 is provided on a side of the retainer 10. The shift detent ridge 35 has a shape with recesses at three positions on the center, upper, and lower portions, and the shift detent pin 34 comes into contact with the shift detent ridge 35 by the elastic force of the spring.

As illustrated in FIG. 3, when the lever body 11 is in the N position, the shift detent pin 34 is in a center recess 36 of the shift detent ridge 35, but when the shifting operation is given to the lever body 11 in the forward direction or the rearward direction, the shift detent pin 34 enters an upper recess 37 or a lower recess 38. At the midway position, the shift detent pin 34 overcomes a ridge in the shift detent ridge 35 while compressing the spring. Therefore, the lever body 11 is held stably at three positions on the center, front, and rear portions corresponding to these recesses, and the shifting operation can provide the feeling of clicking. Next, the position holding function in the select direction is described.

Figure 13:
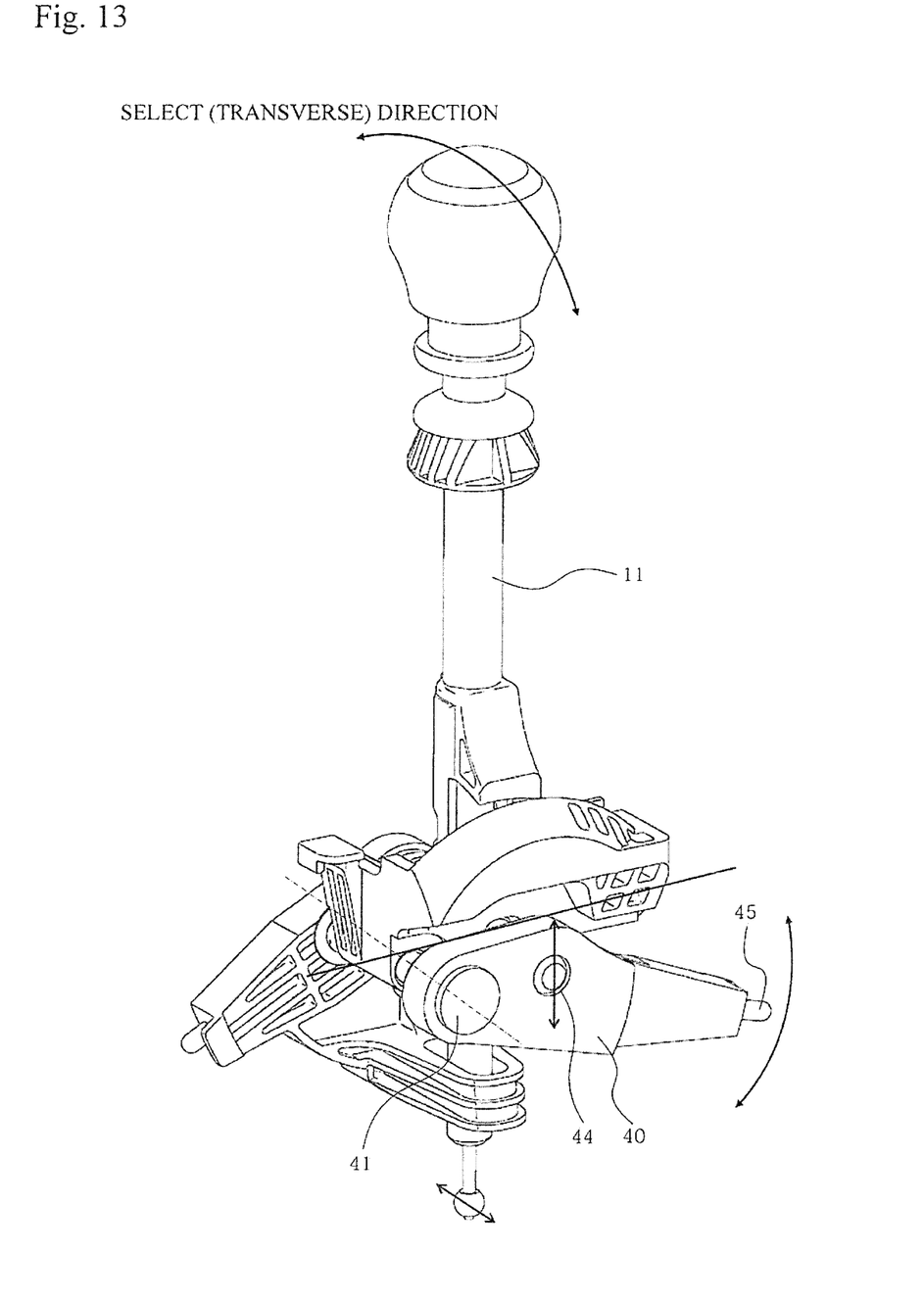
FIG. 13 is a perspective view illustrating a position holding structure for the selecting operation.

As illustrated in FIG. 4 and FIG. 13, a select bellcrank 40 is supported on one side of the retainer 10 such that the select bellcrank 40 can rotate about a rotary shaft 41. The select bellcrank 40 is in the opposite side of the shift bellcrank 30. As illustrated in the sectional view in FIG. 5, the aforementioned ball 13 has an arm 42 extending in the sideward direction, and a ball part 43 at a tip end of the arm 42 engages an engagement hole 44 in the middle position on the select bellcrank 40. When a selecting operation is given to the lever body 11 as illustrated in FIG. 11, the arm 42 swings vertically about the ball 13, so that the select bellcrank 40 swings vertically about the rotary shaft 41.

A select detent pin 45 is provided on a tip end of the select bellcrank 40. Similar to the shift detent pin 34, the select detent pin 45 is also pulsed in a protruding direction by a spring, which is not illustrated. As illustrated in FIG. 4, a select detent ridge 46 is provided on a side of the retainer 10. The select detent ridge 46 has a shape with a center portion having a recess, an upper portion having a slope 47, and a lower portion having slopes 48 and 49 with a slightly bulging center.

When the lever body 11 is in the N position, the select detent pin 45 is in a center recess 50 of the select detent ridge 46 as illustrated in FIG. 4, but when the selecting operation in the right direction of the vehicle is given to the lever body 11 to put the lever body 11 into the 5th or 6th position, the select detent pin 45 comes into contact with the gentle slope 47 in the upper portion and generates a reaction force with the elastic force of the spring to push the lever body 11 back to the center. Therefore, if the lever body 11 is released from a hand when the selecting operation in the right direction from the N position is given, the lever is returned to the N position direction. However, when the shifting operation to the 5th or 6th position is given, the lever body 11 is held at the position of the corresponding position.

When the selecting operation in the left direction of the vehicle from the N position is given to the lever body 11, the select detent pin 45 comes into contact with the slope 48, and also generates a reaction force with the elastic force of the spring to push the lever body 11 back to the center. However, when the shifting operation is given to put the lever body 11 into the 1st or 2nd position, the lever body 11 is held at the position. Note that, when the selecting operation further in the left direction of the vehicle is given to put the lever body 11 into the R position, the select detent pin 45 overcomes the slope 48 to come into contact with the slope 49. Therefore, the reaction force that pushes the lever body 11 back to the center disappears. When the shifting operation to the R position is given, the lever body 11 is held stably in the R position.

As described above, the shift lever device for an electric vehicle according to the present invention allows the lever body 11 to be operated with a shift pattern similar to that of a manual transmission for an engine-powered vehicle and can provide the feeling of operating an MT shift lever.

What is claimed is:

1. A shift lever device for an electric vehicle, the shift lever device comprising:
   a retainer in which a spherical bearing is disposed;
   a lever body that is able to swing in a shift direction and a select direction about a ball held in the spherical bearing; and
   a position sensor unit that is placed at a lower portion of the retainer, wherein
   the position sensor unit includes a slider that is able to slide in a case in the select direction, a magnet that is able to slide on the slider in the shift direction, a sensor board that is placed on a bottom of the case and configured to detect a position of the magnet, and a detent plate with a manual transmission shift pattern placed on a top surface of the case, and
   the magnet is engaged with a lower end of the lever body that penetrates the detent plate and extends into the case, and
   wherein the lever body includes a shift bellcrank that is configured to swing in a shift plane when a shifting operation is given to the lever body, and
   a shift detent pin that is provided on a tip end of the shift bellcrank is made to come into contact with a shift detent ridge fixed to the retainer to hold a position in the shift direction.

2. The shift lever device for an electric vehicle according to claim 1, wherein the sensor board includes a sensor IC that is configured to detect the magnet at the lower end of the lever body and placed on the sensor board.

3. The shift lever device for an electric vehicle according to claim 1, wherein
   the lever body includes a select bellcrank that is configured to swing in a select plane when a selecting operation is given to the lever body, and
   a select detent pin that is provided on a tip end of the select bellcrank is made to come into contact with a select detent ridge fixed to the retainer to hold a position in the select direction.

* * * * *